United States Patent [19]

Suzuki et al.

[11] 3,755,129
[45] Aug. 28, 1973

[54] MACHINE TABLE FEED CONTROL SYSTEM FOR ELECTROLYTIC GRINDING MACHINES

[75] Inventors: Yasuo Suzuki; Tomoyoshi Mikoshiba, both of Yokohama, Japan

[73] Assignee: Hitachi, Ltd., Tokyo, Japan

[22] Filed: Mar. 31, 1972

[21] Appl. No.: 240,031

[30] Foreign Application Priority Data
Apr. 2, 1971 Japan..........................46/19695

[52] U.S. Cl................................. 204/225, 204/228
[51] Int. Cl......................... B23p 1/12, B01k 3/00
[58] Field of Search............ 204/224 M, 225, 129.2, 204/129.46, 228

[56] References Cited
UNITED STATES PATENTS

| | | | |
|---|---|---|---|
| 3,288,693 | 11/1966 | Livshits | 204/224 M X |
| 3,442,785 | 5/1969 | Easton | 204/224 M |
| 3,650,938 | 3/1972 | Olton et al. | 204/225 X |
| 3,684,682 | 8/1972 | Koike | 204/225 X |

Primary Examiner—John H. Mack
Assistant Examiner—D. R. Valentine
Attorney—Paul M. Craig, Jr. et al.

[57] ABSTRACT

In electrolytic grinding machines where a working voltage is applied between grinding wheel and workpiece, the feed speed of the machine table is very important, and an inappropriate speed inconsistent with prevailing working conditions would result in the reduction of working efficiency and working precision and a degraded surface roughness, as well as being prone to short-circuit between the grinding wheel and workpiece.

In this specification, a machine table feed control system for automatically controlling the feed speed of the machine table to an optimum speed consistent to prevailing working conditions is disclosed.

2 Claims, 8 Drawing Figures

MACHINE TABLE FEED CONTROL SYSTEM FOR ELECTROLYTIC GRINDING MACHINES

This invention relates to machine table feed systems for electrolytic grinding machines.

In the usual electrolytic grinding machines, the machine table feed speed has been preset to constant value on the basis of material of workpiece, depth of cut, shape of finish and other working conditions, and manually adjusted when sparking occurs during the grinding process.

With the manual control of the feed speed, however, sufficiently quick response cannot be expected. Therefore, the grinding wheel wears quickly, and the precision is inferior. In addition, when a workpiece is a welding of silver soldering were done in a part of workpiece, the working efficiency is very inferior since the feed speed is preset on the basis of a material of the slowest electrochemical dissolution speed.

There are some spark detection methods which are ulitized in other machines. In one such method a photoconductive element for the detection of spark is used, in another method variation of input power supplied to a grinding wheel drive motor is detected, in a further method a variation in working current is detected through a shunt, and in a still further method the shaft torque is detected. These methods, however, cannot be applied to the electrolytic grinding where the grinding wheel and workpiece are brought into extremely slight contact (short-circuited) with each other.

An object of the invention is to provide a machine table feed control system for electrolytic grinding machines, with which the feed speed of the machine table can be automatically set to an optimum speed consistent to prevailing working conditions.

To this end, the control system according to the invention comprises a detecting circuit to detect the state of spark generation between a grinding wheel and a workpiece through resonant circuit means, a spark signal shaping circuit to shape the spark signal output source the detecting circuit for each predetermined pulse period irrespective of the amplitude of the working current, a memory to phase modulate the output signal of the spark signal shaping circuit and store the modulated information, and a speed control circuit to control the speed of a feed motor in accordance with the output content of the memory. In the spark signal shaping circuit, the spark signal output of the detecting circuit is processed to remove noise components, and the resultant signal free from noise is shaped on the basis of a pulse signal, which is derived by modulating a soruce waveform and at a predetermined pulse frequency. When the working current is low, a signal from a shunt or a resonant circuit is processed to obtain the spark signal, while when the working current is high the spark signal is obtained through a separate resonant circuit. The spark signal thus obtained and which is shaped for each predetermined pulse period is smoothed through the memory into a gradually varying waveform, which is coupled to the gate of an SCR connected to a power source feeding a machine table feed motor so as to control the effective power supplied to the motor, thereby controlling the motor speed.

The accompanying drawings show preferred embodiments of the invention, and in which:

FIGS. 1 to 8 show an embodiment of the electrolytic grinding machine table feed control system according to the invention.

Figure 1:
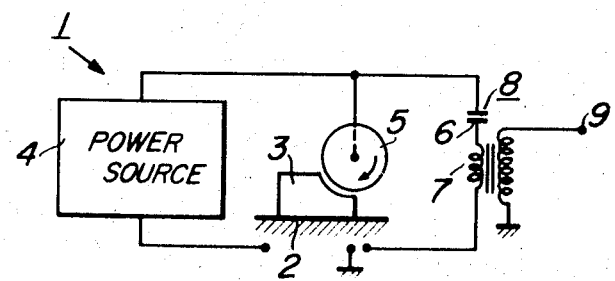
FIG. 1 is a schematic representation of a detecting circuit.
Figure 3:
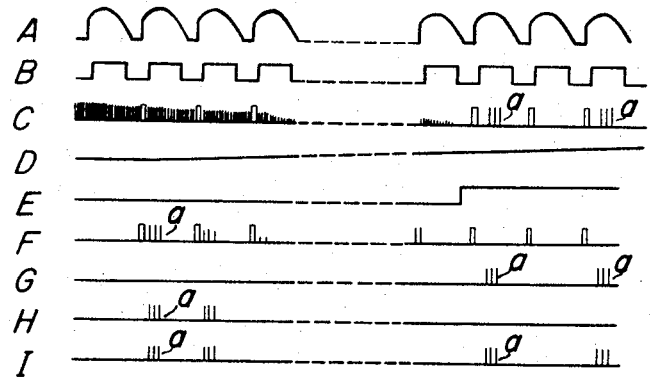
FIG. 3 is a timing chart showing waveforms occurring at various parts of the circuit of FIG. 2.

Referring to FIG. 1, reference numeral 1 generally designates a detecting circuit. A grounded machine table 2 carries a workpiece 3 set thereon. The table and a grinding wheel 5 of graphite or the like are connected to a power source 4, to which a resonant circuit of capacitor 6 and coil 7 and generally designated at 8 is also connected. The coil 7 is electromagnetically coupled to an output terminal 9. When the grinding wheel 5 and workpiece 3 are electrically brought into contact with each other (lightly short-circuited), the resonant circuit 8 generates a spark signal appearing at the output terminal 9. The working voltage at this time is a full-wave rectified d-c voltage as shown at A (FIG. 3).

Figure 2:
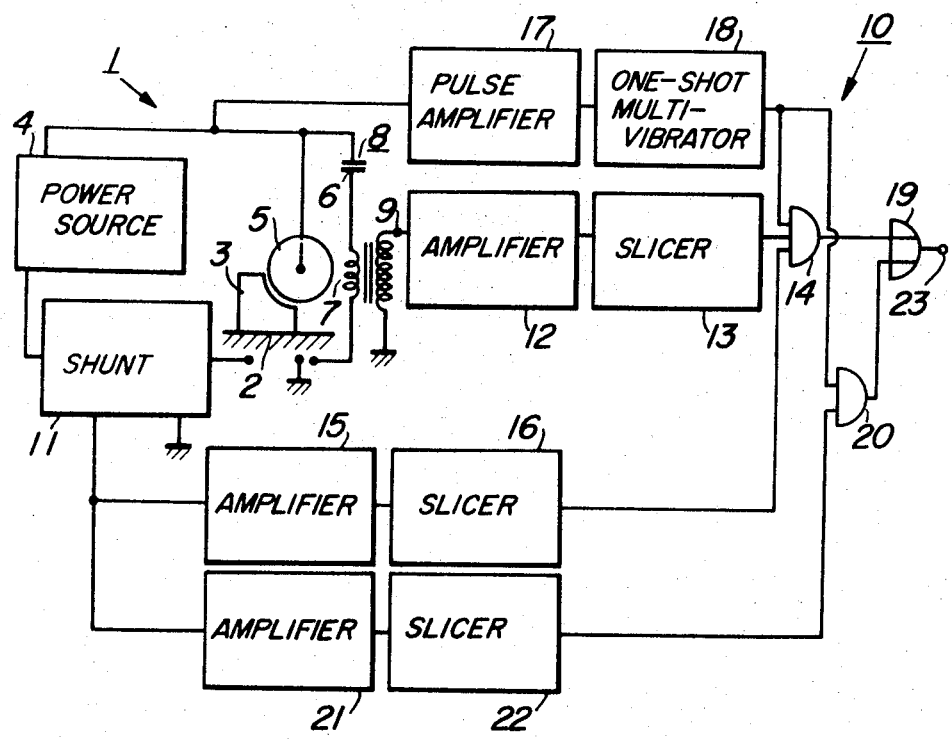
FIG. 2 is a schematic representation of a spark signal shaping circuit.

FIG. 2 shows the above detecting circuit 1 together with a spark signal shaping circuit generally designated at 10. The working current from the power source 4 is shunted at a shunt 11. The output terminal 9 is connected through an amplifier 12 and a slicer 13 to one input terminal of an AND gate 14. The shunt 11 is coupled through another amplifier 15 and another slicer 16 to another input terminal of the AND gate 14. Further, the power source 4 at the side thereof connected to the grinding wheel 5 is also connected through a pulse amplifier 17 and a one-shot multi-vibrator 18 to a third input terminal of the AND gate 14. The output of the AND gate 14 is coupled to an OR gate 19. The output of the one-shot multi-vibrator 18 also constitutes an input to another AND gate 20. The shunt 11 is also coupled through a further amplifier 21 and a further slicer 22 to the other input terminal of the AND gate 20. The AND gate 20 is connected to the OR gate 19 which is connected to an output terminal 23.

The slicer 13 receiving the amplified spark signal provided an output signal having a waveform as shown at C (FIG. 3) and constituting an input to the AND gate 14. Since the working voltage A is differentiated through an SCR system, the output C contains a corresponding series of pulses at a constant repetition frequency. Also, in the initial working stage where there are fluctuations in the electrolyte and the process are not stabilized yet, high frequency current fluctuations are caused and constitute noise added to the spark signal waveform a.

Since other components than the spark signal waveform a are undesired, they are removed from the output C. This is done at the AND gate 14. More particularly, the one-shot multi-vibrator 18 produces output of waveform B (FIG. 3) from the waveform A, whereby the differential pulse component is removed. The high frequency noise is removed by arranging such that the output E(FIG. 3) of the slicer 16 will not be raised to a high level until a voltage D(FIG. 3) provided by the amplifier 21 detecting mean shunted working current from the shunt 11 exceeds a predetermined leve. In this manner, the AND gate 14 provides output waveform G(FIG. 3) solely consisting of the spark signal waveform $a$ during the stabilized process.

During the initial working stage during which the working current is low, the spark waveform can be detected through the shunt. In this embodiment, the slicing level for amplifier 21 and slicer 22 is adjusted such that the AND gate 20 receiving the afore-mentioned waveform B and the output of the slicer 22 provides output signal H (FIG. 3). The spark signals H and G during the initial non-stabilized stage and the subsequent stabilized stage are combined at the OR gate 19 to produce resultant waveform I (FIG. 3) available at the output terminal 23. In this manner, the spark signal $a$ freed from any noise component can be obtained for the entire process.

Figure 4:
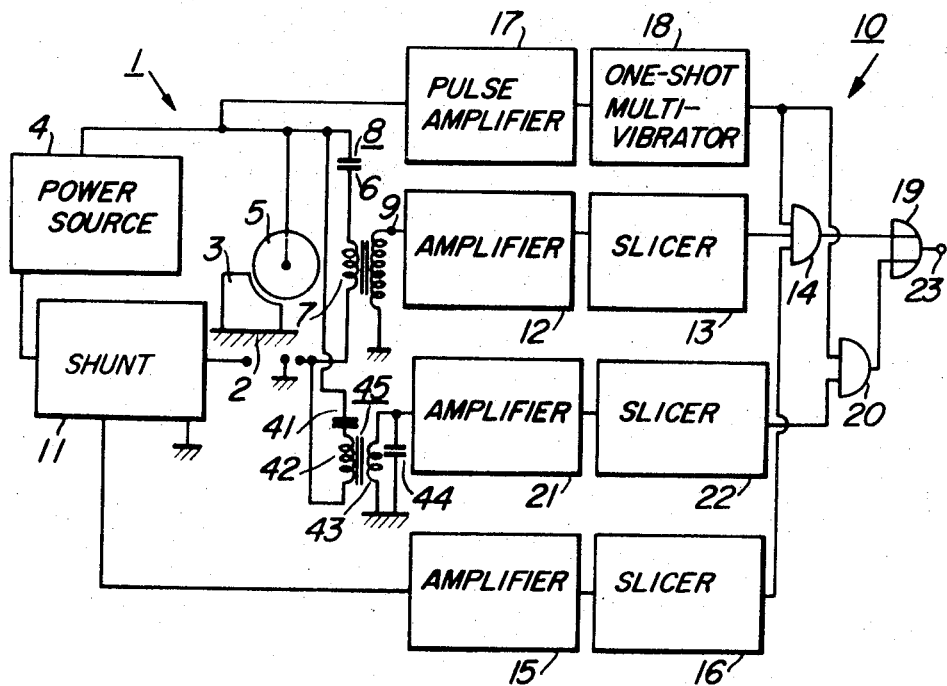
FIG. 4 is a schematic representation of another example of the spark signal shaping circuit.

FIG. 4 shows another embodiment of the invention. This embodiment is the same as the preceding embodiment insofar as it includes resonant circuit 8 and shunt 11 for the detection of the spark waveform. In this embodiment, however, another resonant circuit consisting of a primary series circuit of capacitor 41 and coil 42 and a secondary parallel circuit of coil 43 and capacitor 44 and generally designated at 45 is provided in parallel with the resonant circuit 8. With this arrangement, during the initial low working current stage the resonant circuit 45 detects the signal, which is then coupled through amplifier 21 and slicer 22 to the AND gate 20. This enables the obtaining of superior detection of spark waveforms during the small working current stage as well as during the large working current stage.

The other parts are the same as in the preceding embodiment, so they are designated by the same reference numerals as in FIG. 2.

Figure 5:
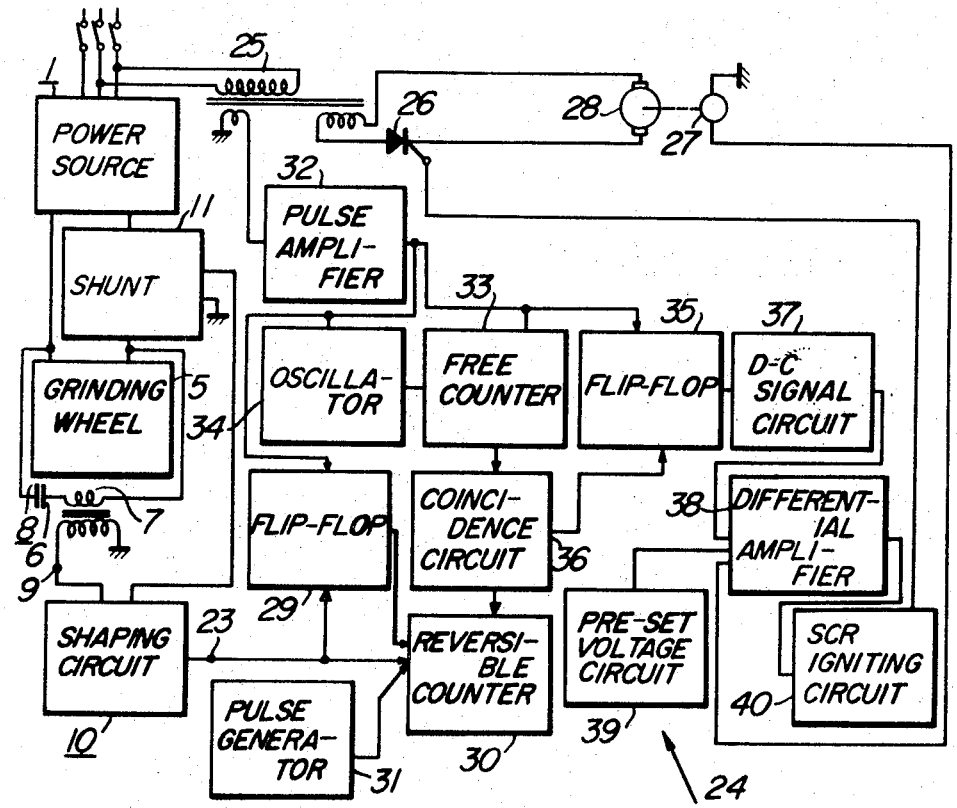
FIG. 5 is a schematic representation of a speed control circuit.
Figure 6:
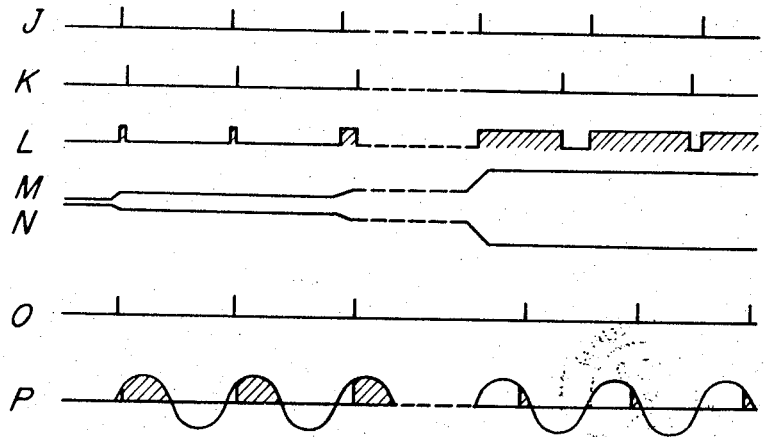
FIGS. 6 to 8 are timing charts showing waveforms occuring at various parts of the circuit of FIG. 5.

FIG. 5 shows the detecting circuit 1 and spark signal shaping circuit 10 together with a speed control circuit generally designated at 24. Connected across one secondary coil of a source transformer 25 through a three-terminal thyristor 26 (hereinafter referred to as SCR) is a machine table feed motor 28, to which a tachogenerator 27 is coupled. The output terminal 23 is connected to a flip-flop 29 and to a reversible counter 30, to which the output of the flip-flop 29 and a pulse generator 31 are also coupled. The secondary of the source transformer 25 is also connected to a pulse amplifier 32, whose output is connected to the flip-flop 29, a free counter 33, an oscillator 34 connected to the free counter 33 and to another flip-flop 35. The outputs of the free counter 33 and reversible counter 30 are coupled to a coincidence circuit 36, whose output is coupled to the flip-flop 35, whose output is in turn coupled through a d-c signal circuit 37 to a differential amplifier 38, to which a pre-set voltage circuit 39 is connected. The output of the differential amplifier 38 is coupled through an SCR igniting circuit 40 to the gate of the SCR 26. The output of the tachogenerator 27 is fed back to the differential amplifier 38.

Figure 7:
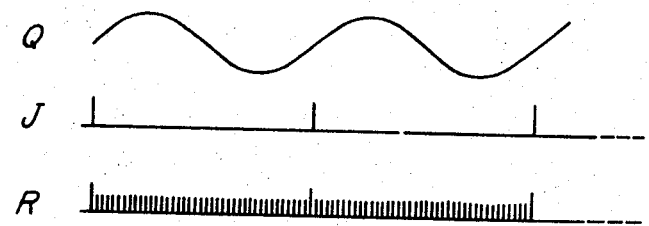
Figure 8:
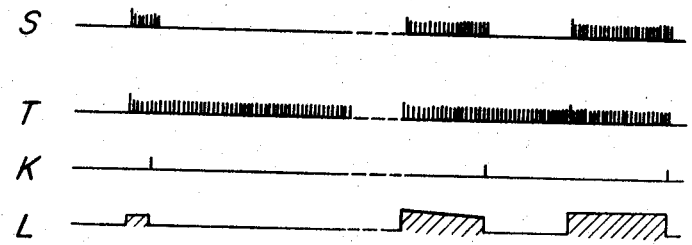

The output I solely consisting of the spark signal $a$ appearing at the output terminal 23 sets the flip-flop 29 to provide an additional command to the reversible counter 30 so as to cause the counting operation of the counter. The content of the reversible counter 30 is as shown at S in FIG. 8. When the spark signal $a$ vanishes, the pulse amplifier 32 generates a pulse signal J synchronized with the source frequency, whereupon the flip-flop 29 provides a subtraction command to the reversible counter 30 for subtraction of a train of pulses provided from the pulse generator 31 and having an extremely long pulse period of about one pulse per 10 seconds. The pulse signal J from the pulse amplifier 32 is also coupled to the oscillator 34 which provides clock pulses R (FIG. 7) at a high pulse frequency to the free counter 33 to be read thereby. When a predetermined number of pulses are read, the counter 33 is reset by the pulse signal J from the pulse amplifier 32. In other words, the counter 33 repeatedly counts a predetermined number of clock pulses for each pulse period of the pulse signal J. When the content S of the reversible counter 30 coincides with the content T of the free counter 33, the coincidence circuit 36 provides pulse output K, whereby the flip-flop 35 provides output signal of waveform L. This signal L is smoothed through the d-c signal circuit 37 into a waveform M. Receiving this signal M, the differential amplifier produces output of an inverse waveform N, which is the difference of the input waveform M from the voltage level for driving the feed motor 28 at full speed. With the voltage of the waveform N the SCR igniting circuit 40 produces a pulse signal 0 which is impressed upon the gate of the SCR 26, so that the output waveform Q of the source transformer 25 is rendered into a waveform P. In this manner, the speed of feed motor 28 is controlled by controlling the effective power.

As has been described in the foregoing, according to the invention the speed of the feed motor is controlled by detecting the relation between grinding wheel and workpiece through a detecting circuit, removing noise from the detection output to obtain sole spark signal, and modifying the power supply to the motor according to the spark signal through a speed control circuit. Thus it is possible to achieve continuous control of the motor speed at an optimum speed, thus minimizing the wear of the grinding wheel and improving the precision of machining. Also, since the feed speed is automatically controlled, the machining efficiency may be greatly increased with the automatic optimum feed of machine table.

What is claimed is:

1. A machine table feed control system for electrolytic grinding machines comprising a detecting circuit to detect the state of spark generation between a grinding wheel and a workpiece, a spark signal shaping circuit to remove noise from the spark signal output of said detecting circuit and shape the resultant spark signal free from noise, a memory to phase modulate the output signal of said spark signal shaping circuit and store the modulated information and a speed control circuit to control the speed of a feed motor in accordance with the output content of said memory.

2. A machine table feed control system for electrolytic grinding machines comprising a detecting circuit to detect the state of spark generation between a grinding wheel and a workpiece, said detecting circuit including a plurality of resonant circuits, a spark signal shaping circuit to remove noise from the spark signal output of said detecting circuit and shape the resultant spark signal free from noise, a memory to phase modulate the output signal of said spark signal shaping circuit and store the modulated information, and a speed control circuit to control the speed of a feed motor in accordance with the output content of said memory.

* * * * *